UNITED STATES PATENT OFFICE.

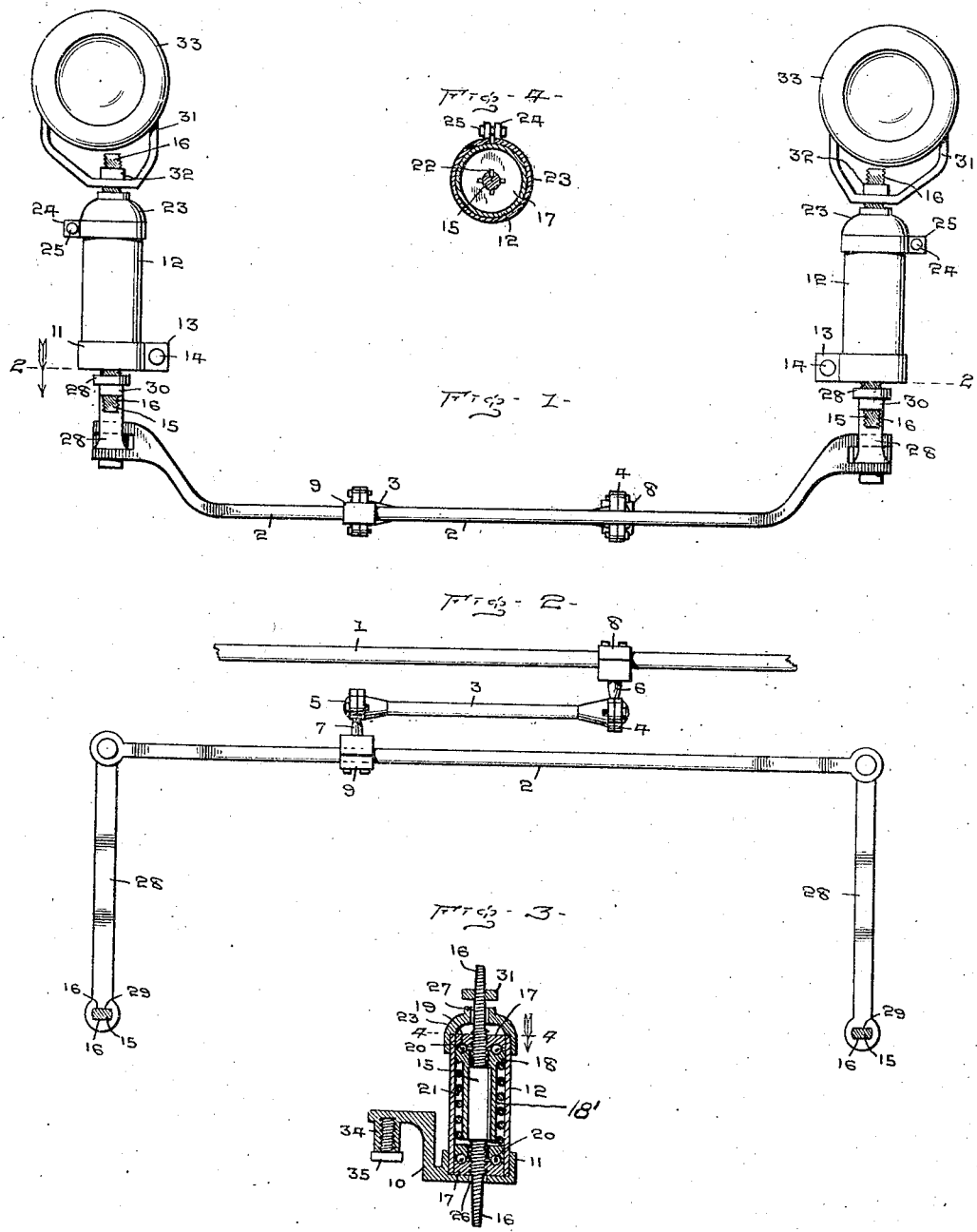

GEORGE S. GESSNER, OF SELINSGROVE, PENNSYLVANIA.

DIRIGIBLE HEADLIGHT.

1,199,777.     Specification of Letters Patent.     Patented Oct. 3, 1916.

Application filed May 22, 1916. Serial No. 99,183.

*To all whom it may concern:*

Be it known that I, GEORGE S. GESSNER, a citizen of the United States, residing at Selinsgrove, in the county of Snyder and State of Pennsylvania, have invented certain new and useful Improvements in Dirigible Headlights; and I do hereby declare the following to be a full, clear, and exact description of the invention, such as will enable others skilled in the art to which it appertains to make and use the same.

My invention relates to new and useful improvements in light shifting means for automobiles and similarly propelled vehicles, and my object is to provide means in connection with the steering rod of the vehicle for moving the lamps, whereby the light will be reflected in the direction in which the vehicle is to move.

A further object is to provide brackets for attaching the lamps to the steering mechanism.

A further object is to provide means for taking up wear between parts of the steering mechanism and prevent rattling thereof. And a further object is to provide means for attaching the steering mechanism to parts of a vehicle.

Other objects and advantages will be hereinafter set forth and more particularly pointed out in the accompanying specification.

In the accompanying drawings which are made a part of this application, Figure 1 is a front elevation of the steering mechanism showing the lamps attached thereto. Fig. 2 is a sectional view thereof as seen on line 2—2 of Fig. 1. Fig. 3 is a vertical central sectional view through the lamp supporting means with the steering mechanism disengaged therefrom, and Fig. 4 is a sectional view thereof as seen on line 4—4 of Fig. 3.

Referring to the drawings in which similar reference numerals designate corresponding parts throughout the several views, 1 indicates the steering rod, such as is commonly used for steering the front wheels of an automobile, or similarly propelled vehicles, and 2 indicates an auxiliary steering rod which is connected to the steering rod 1 through the medium of a pitman 3, said pitman having at opposite ends sockets 4 and 5 which engage balls (not shown) attached to stems 6 and 7 respectively carried by blocks 8 and 9 which are clamped into engagement with the rods 1 and 2 respectively, and it will be readily seen that when the steering rod 1 is given an endwise thrust to change the course of the wheels of the vehicle, the auxiliary steering rod 2 will be moved longitudinally, in the same direction.

Mounted upon any suitable part of the vehicle, preferably the axle, are brackets 10, said brackets having circular flanges 11 to form seats for the lower ends of the tubular casings 12, said flanges having split portions, upon opposite sides of which are formed integral ears 13 which are drawn together by means of bolts 14, thereby securely locking the casings into engagement with the bracket.

Extending vertically through the casings 12 are standards 15 which are threaded for a portion of their length, the upper and lower ends of the standards having flat tapered faces 16 for purposes to be hereinafter set forth, said shafts having threaded thereon collars 17, which fit within the opposite ends of the casings 12, and movably mounted on said standards between the collars 17 are collars 18, the upper collars 18 having sleeves 18′ extending downwardly therefrom and fitting over the unthreaded portions of said standards, the said sleeves having shoulders which abut against the shoulders of the unthreaded portions of the standards, said collars having races 19 formed in their meeting faces in which are placed bearing balls 20, the collars 18 being held in juxtaposition to the threaded collars 17 by means of coil springs 21 which extend from the upper to the lower collars 18 and around the sleeves of the upper collars. After the collars 17 have been properly positioned upon the standards 15 they are fixed thereto by means of splines 22, or in any suitable manner.

The upper ends of the casings 12 are provided with caps 23 which are likewise provided with split portions having ears 24 on opposite sides thereof which are clamped together by means of bolts 25 for locking the cap into engagement with the casings, said brackets and caps having openings 26 and 27 respectively through which project the portions of the standards 15 having flat faces 16.

Extending between the standards 15 and the ends of the auxiliary steering rod 2 are straps 28, one end of the straps being pivotally attached to the ends of the auxiliary steering rod, while the opposite ends thereof are provided with oblong tapered slots 29 which engage the lower tapered ends of the standards 15 and fit the flattened portions thereof, said straps being held in engagement with the standards by means of nuts 30, the taper of the faces 16 being such as to hold the straps out of engagement with the brackets, and it will be readily seen that when the auxiliary steering rod is moved lengthwise the standards will be rotated a predetermined distance.

Fitting over the upper ends of the standards 15 and having openings therethrough to fit the flattened tapered faces of the standards 15, are brackets 31 which are held in engagement with the standards by means of nuts 32, the upper ends of said brackets supporting the lamps 33, while the brackets are so constructed that they can be positioned adjacent the mud guard of the machine and still rotate without interfering therewith, the downward movement of said brackets on the standards being likewise limited by the taper of said faces. The brackets 10 are provided with depending stems 34 which extend through parts of the vehicle and are attached thereto by introducing bolts 36 into threaded openings in said stems, the outer ends of the bolts having heads thereon which hold the stems in engagement with the parts to which they are attached.

In operation, when the steering rod 1 is moved lengthwise to shift the direction of the travel of the wheels of the vehicle, the standards 15 will be rotated in such manner as to move the lamps so as to reflect the rays of light therefrom directly in the path in which the vehicle is traveling, thereby enabling the driver to observe any obstructions that might otherwise be encountered.

This device can be very cheaply constructed and applied to practically any make of car at a minimum expense and without changing any of the parts of the car, other than providing an opening for the reception of the stems of the brackets which carry the standards. It will likewise be seen that as all of the parts of the device are constructed of metal, it will be practically indestructible and may be transferred from one machine to another. And it will likewise be seen that by providing the bearing balls and the spring for holding the bearing collars in engagement with the balls, any wear between the parts will be compensated for, and furthermore that the collars at the outer ends of the casings may be adjusted on the standards to increase or decrease the distance between said collars.

I claim:—

1. In a light shifting means, the combination with the steering rod of a vehicle, of brackets carried by parts of the vehicle, a casing carried by each bracket, a cap at the upper end of each casing, a standard extending vertically through each casing and through the cap and bracket at the ends thereof, said standard being threaded adjacent its ends and having flat tapered faces at its ends, a collar at each end of the casing, means to hold said collars in fixed relation with the standard, a pair of movable collars surrounding the standard between the first mentioned collars and slidable on the standard, bearing balls between the pairs of collars, means to yieldingly hold the movable collars in juxtaposition to the fixed collars, means between the lower ends of the standards and the steering rod to cause said standards to rotate when the steering rod is shifted to guide the vehicle, and lamps attached to the upper ends of said standards adapted to be rotated with the standards.

2. In a light shifting device, the combination with the steering rod of a vehicle, of a pair of brackets attached to parts of the vehicle, said brackets having flanges thereon, a standard extending vertically through each bracket, said standard being exteriorly threaded at its ends and having flattened tapered portions at each end, a casing seated in said flange, collars threaded on to said standard, one at each end of the casing, additional collars slidably mounted on the standard between the first mentioned collars, said collars being arranged in pairs, bearing balls between each pair of collars, a spring adapted to hold the movable collars in juxtaposition to the fixed collars, means to hold the first mentioned collars against rotation on the standard, means to attach the lower end of the standard to the steering rod of the vehicle, whereby when the steering rod is shifted to guide the vehicle, the standard will be rotated, a bracket engaging the upper end of each standard and caused to rotate therewith, and a lamp carried by said bracket and adapted to rotate with the standard.

In testimony whereof I have signed my name to this specification in the presence of two subscribing witnesses.

GEORGE S. GESSNER.

Witnesses:
ARTHUR R. MARKLEY,
CHAS. G. HENDRICKS.